United States Patent
Adler et al.

(10) Patent No.: US 7,191,395 B2
(45) Date of Patent: Mar. 13, 2007

(54) METHOD AND SYSTEM FOR STYLESHEET-CENTRIC EDITING

(75) Inventors: Sharon C. Adler, Greenwich, RI (US); Anders LR Berglund, Greenwich, RI (US); Thomas Joseph Brawn, Apex, NC (US); Adam R. Clarke, Raleigh, NC (US); Danielle Madeleine Cusson, Raleigh, NC (US); Angel Luis Diaz, Carmel, NY (US); Douglas Charles Lovell, Garrison, NY (US); Olusola A. Omosaiye, Raleigh, NC (US); Henry Retter, New Fairfield, CT (US); Kristoffer H. Rose, Poughkeepsie, NY (US); Jason A. Sholl, Durham, NC (US)

(73) Assignee: International Business Machines Corporation, Armonk, NY (US)

(*) Notice: Subject to any disclaimer, the term of this patent is extended or adjusted under 35 U.S.C. 154(b) by 525 days.

(21) Appl. No.: 10/095,827

(22) Filed: Mar. 12, 2002

(65) Prior Publication Data

US 2004/0205571 A1    Oct. 14, 2004

(51) Int. Cl.
*G06F 17/30* (2006.01)
(52) U.S. Cl. .................. 715/513; 715/523; 715/514
(58) Field of Classification Search .............. 715/523, 715/513; 235/462.01; 707/102, 523; 395/600
See application file for complete search history.

(56) References Cited

U.S. PATENT DOCUMENTS 5,915,259 A * 6/1999 Murata ...................... 715/513
5,926,806 A    7/1999 Marshall et al. ................ 707/3
5,956,726 A * 9/1999 Aoyama et al. ............ 707/102
6,279,015 B1 * 8/2001 Fong et al. .................. 715/523
6,502,112 B1 * 12/2002 Baisley ....................... 715/513
6,540,142 B1 * 4/2003 Alleshouse ............ 235/462.01
6,772,165 B2   8/2004 O'Carroll ................... 707/101
6,845,380 B2   1/2005 Su et al.

OTHER PUBLICATIONS

Emmanuel Pietriga, VXT: a visual approach to XML transformations, 2001, ACM Press, pp. 1-10.*
Lionel Villard, Authoring Transformations by Direct manipulation for Adaptable Multimedia Presentations, 2001, ACM Press, pp. 125-134.*
Leslie, "Transforming documentation from the XML doctypes used for the apache website to DITA", Oct. 21, 2001, ACM Press, New York, pp. 157-164.
Becker, [xsl] merging XML documents <eom>, Jan. 31, 2001, pp. 1-2 http://www.xslt.com/html/xsl-list/2001-01/msg0153.html.

* cited by examiner

*Primary Examiner*—Heather R. Herndon
*Assistant Examiner*—Gautam Sain
(74) *Attorney, Agent, or Firm*—Duke W. Yee; Jerry W. Herndon; Gerald H. Glanzman

(57) ABSTRACT

A method (and structure) for enacting changes to a document containing a template-based program that transforms tree-structured data from a first tree-structured data into a second tree-structured data, including providing an interface to permit selection of a document containing the template-based program, constructing a model of the template-based program in the selected document by parsing elements of the template-based program into a corresponding logical construct having a match condition and at least one generator, where the match condition determines whether an element in the first tree-structure data is to be processed by one or more of the at least one generator, and displaying a representation of the model to the user.

17 Claims, 8 Drawing Sheets

METHOD AND SYSTEM FOR STYLESHEET-CENTRIC EDITING

CROSS-REFERENCE TO RELATED APPLICATIONS

The present Application is related to the following co-pending applications:

U.S. patent application Ser. No. 10/095,797 filed on Mar. 12, 2002, to Adler et al., entitled "METHOD AND SYSTEM FOR STYLESHEET RULE CREATION, COMBINATION, AND REMOVAL";

U.S. patent application Ser. No. 10/095,737 filed on Mar. 12, 2002, to Rose, K. H., entitled "METHOD AND SYSTEM FOR COPY AND PASTE TECHNOLOGY FOR STYLESHEET EDITING"; and U.S. patent application Ser. No. 10/096,379, filed on Mar. 12, 2002, to Clarke et al., entitled "METHOD AND SYSTEM STYLESHEET EXECUTION INTERACTIVE FEEDBACK", all assigned to the present assignee, and all incorporated herein by reference.

BACKGROUND OF THE INVENTION

1. Field of the Invention

The present invention relates generally to editing of stylesheets such as used in XSLT (extensible Style Language Transformations), and more specifically, to a stylesheet editor in which a user edits a stylesheet indirectly through interactions with a GUI (graphical user interface) representation of a model of the underlying stylesheet, as developed by the editor, rather than modifying directly the text of the stylesheet itself, thereby providing an overview and convenience to the user that is not available in conventional stylesheet editors.

2. Description of the Related Art

XSL (eXtensible Style Language) is a standard for an XML-compatible stylesheet language, published and maintained by a working group at the World Wide Web Consortium (W3C). XSLT (extensible Style Language Transformations) is one of the standards in XSL. XML (eXtensible Markup Language) is a pared-down, simplified version of SGML (Standard Generalized Markup Language) and is designed especially for Web documents to allow the use of SGML on the Web. SGML is a standard set of codes for marking boldface, italics, etc., in ASCII text files and became the basis for HTML (HyperText Markup Language), which is the current standard to publish information on the Internet.

By defining a syntax permitting the creation of markup languages to specify information structures, XML allows one to define their own customized markup language and provides an avenue to overcome limitations of HTML. Information structures define the type of information, for example, subscriber name or address. Using XML, external processes can manipulate these information structures and publish them in a variety of formats.

FIG. 1 shows an overview of the conventional method of editing an XSLT stylesheet. An XSLT stylesheet 10 includes a set of rules that describe how to process elements of an input XML document 11 to transform these elements into XML output document 12. The actual transformation is executed by transformation engine 13, which is typically an XML application that often additionally includes an XML parser 14 (as shown in FIG. 2). Each rule of the stylesheet 10 matches one or more elements in the input document and describes the actions to take and the output to produce when a matching element is found. It should be noted that although FIG. 1 shows the input 11 as being a document, there is no restriction that it be an actual document or file. It could be any source of XML input data, such as a portion of a file or a portion of a database.

A practical example of the scenario of FIG. 1 that demonstrates the potential of XML over HTML would be one in which the input XML document 11 is a catalog or database written in XML of items offered by a manufacturer. Output XML document 12 might be part of the inventory written in XML of a retail operation and that includes at least some of this manufacturer's items in addition to a multitude of other manufacturers' catalog items. The information structure and content in the manufacturer's inventory XML database 11 would likely differ from the information structure and content in the retailer's XML database 12. Stylesheet 10 contains the set of rules appropriate to convert each respective manufacturer's data elements into the format required by the retailer.

The conventional paradigm for editing an XSLT stylesheet typically includes having the user make changes directly to the text in a file containing the XSL stylesheet. The user would then confirm any such changes by executing the transformation defined by the stylesheet, using an XML input document 11 and transformation engine 13, and viewing the resultant output XML document 12. However, creating or changing the rules in an XSLT stylesheet is difficult and complex because the user must understand the relationship between the input document, the stylesheet rules and the output document. Such understanding is often times extremely difficult.

SUMMARY OF THE INVENTION

In view of the foregoing problems, drawbacks, and disadvantages of the conventional systems, it is an object of the present invention to provide a structure (and method) that greatly assists in the development of an XSLT stylesheet.

More generally, it is an object of the present invention to provide a structure and method for an editor to be used by a user to modify instructions that define a transformation of one tree-structure syntax into a second tree-structure syntax without having to edit directly the text of a stylesheet containing the rules that define that transformation.

It is another object of the present invention to provide such an editor in which the user interacts with the editor through the convenience of a WYSIWYG display/interface and the editor automatically provides the equivalent as if the text of the underlying stylesheet had been directly edited by the user.

To achieve the above objects and goals, according to a first aspect of the present invention, described herein is a method and structure for enacting changes to a document containing a template-based program that transforms tree-structured data from a first tree-structured data into a second tree-structured data, including providing an interface to permit selection of a document containing the template-based program, constructing a model of the template-based program in the selected document by parsing elements of the template-based program into a corresponding logical construct having a match condition and at least one generator, where the match condition determines whether an element in the first tree-structure data is to be processed by one or more of the at least one generator, and displaying a representation of the model to the user.

According to a second aspect of the present invention, also described herein is a signal-bearing medium tangibly embodying a program of machine-readable instructions executable by a digital processing apparatus to perform this method.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
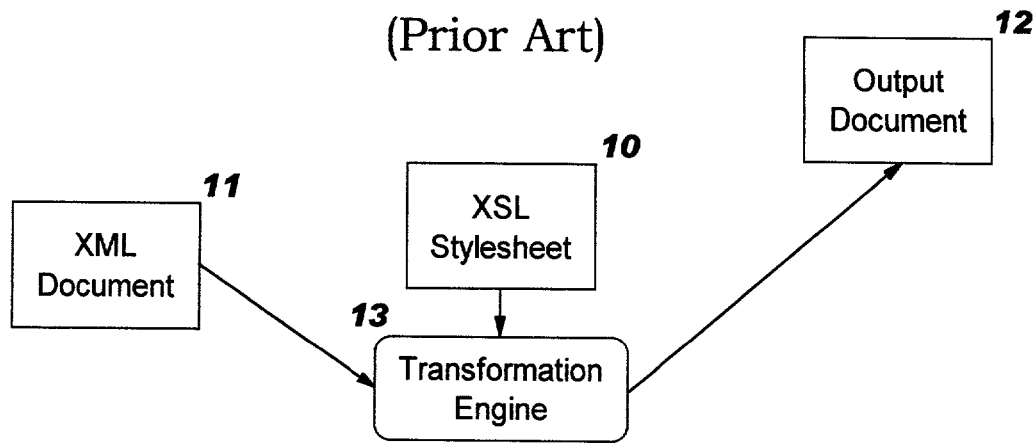
FIG. 1 shows an overview of XML transformation using an XSL stylesheet and the conventional XSL editing process.

Referring now to the drawings, an exemplary embodiment of the present invention will now be described. Briefly, the present invention provides a new way of looking at an XSLT stylesheet that allows for better understanding of the relationship between the input document 11, the stylesheet rules 10, and the output document 12.

As shown in FIG. 1, an XSLT stylesheet 10 is used to transform source XML 111 to result XML 12. The structure and content of the result are determined by the source as interpreted, sampled, or elaborated by the stylesheet 10:

Source-1 Element + Stylesheet Rule ==> Result-1
Source-2 Element + Stylesheet Rule ==> Result-2

An XML document contains elements, attributes, and text. A stylesheet contains rules. Rules match elements, attributes, and/or text in the source. When a rule matches, it executes in context of the matched source. It produces some result XML influenced by that context.

XML may be represented as a "tree" of "nodes". Each node of the tree is an element or text. The node at the top of the tree is the "root". All of the nodes connected to the root are the "children" of the root, which is their "parent":

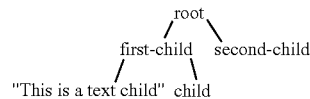

An XSLT stylesheet is itself written as XML. Each rule in the stylesheet is a node in a tree:

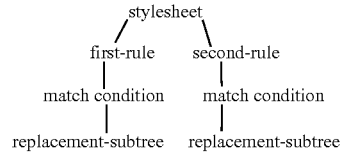

Each rule is applicable whenever processing reaches an input XML node that matches its "match condition". Default rules are defined by the environment such that all nodes are matched. Match conditions of XSLT are expressed in the W3C Xpath standard language.

Figure 2:
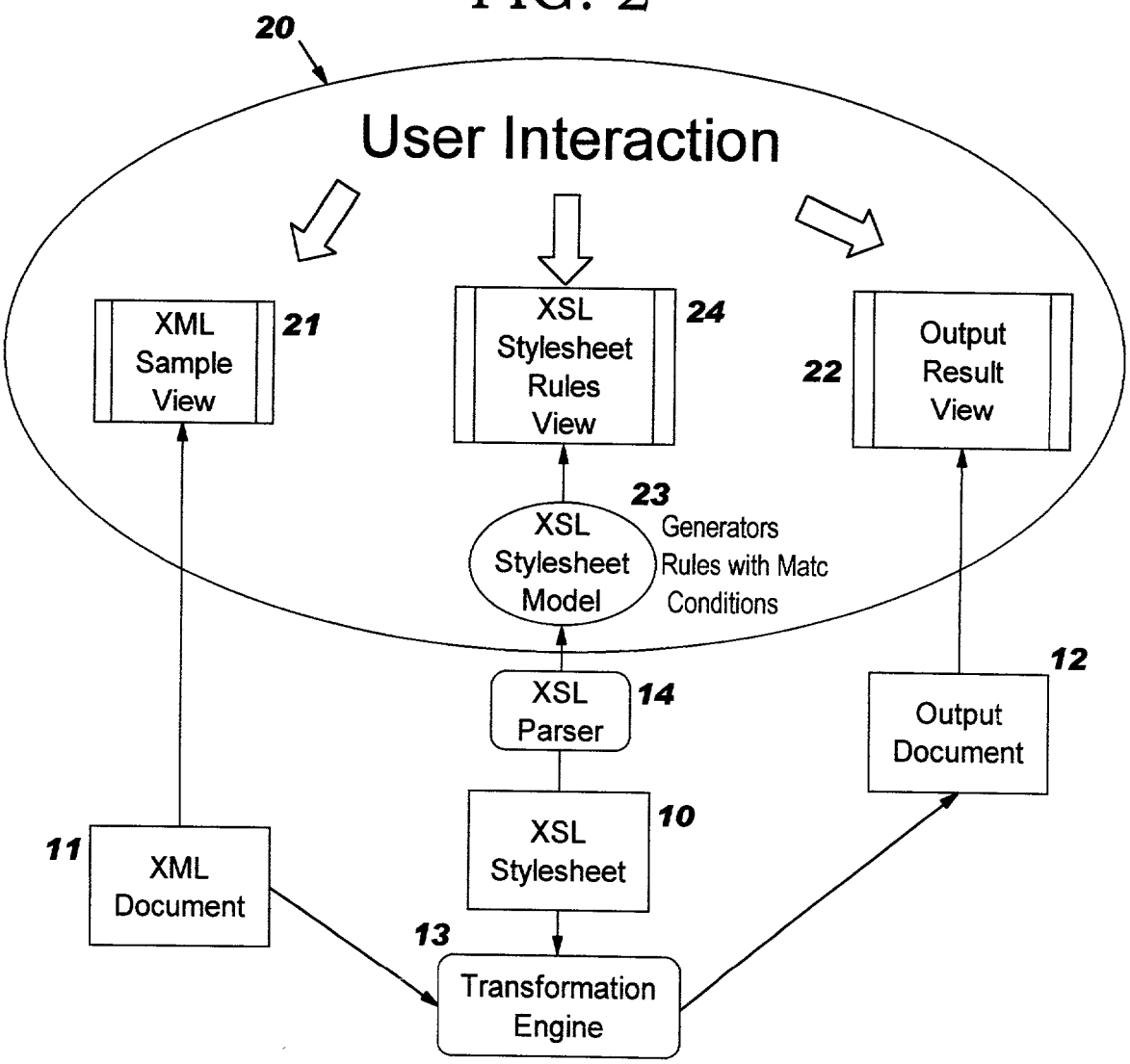
FIG. 2 shows an overview of exemplary basic XSL editor of the present invention.

As shown in FIG. 2, the present invention provides an stylesheet centric XSL editor 20 in which a user interacts with a GUI that includes a WYSIWYG ("what you see is what you get") output result view 22 of the output document 12 as executed by transformation engine 13. The user also can view a sample view 21 of the input XML source 11. The editor 20 includes a model 23 of the underlying XSL stylesheet 10. Unlike the conventional paradigm for editing XSL stylesheets, the user does not have to directly modify the text of the stylesheet file. Instead, the user interacts with stylesheet through stylized GUI representations 21, 22, 24 of the underlying XML documents. Although GUIs are used in conventional XSL editors, none provide the level of sophistication of the present invention in which a user has the convenience of a WYSIWYG interface that totally eliminates the need for the user to tediously edit directly the text of the XSL stylesheet 10.

Although the concepts taught for the exemplary embodiment described herein nominally address an XSL stylesheet editor, these concepts are applicable for more generic editors, such as one used for XML processors or even any process that operates on an underlying tree structure, an inherent characteristic of XML. Thus, the present invention actually teaches concepts applicable for any editor of programs transforming tree structures.

It is noted that the present invention and the above-referenced co-pending applications are all related to this new editor as being techniques developed by the inventors to provide simplification and an enhanced overview for modifications of documents having a tree structure such as is inherent in XML and XSL. The present invention describes the concept for the basic editor itself. The three other co-pending applications address other refinements that coincidentally have been incorporated into this basic editor as additional features to greatly enhance the convenience of the basic editor. These additional features are viewed as independent inventions applicable elsewhere than the exemplary embodiment of the basic editor described herein.

Although there are currently WYSIWYG editors for HTML in which the user views and modifies the output document, these conventional editors directly modify the underlying HTML document. The problem presented in XML is that the XSL stylesheet 10 is a set of rules that define the transformation to convert XML input 11 into XML output 12. The editing of these stylesheet rules inherently present a difficulty not encountered in the simple generation of a document directly underlying an HTML output document. The editor of the present invention solves this problem by providing a WYSIWYG display to allow the user to interact with an XSL stylesheet model 23 developed by the editor program as a representation of the underlying XSL stylesheet 10. The user need not make text modifications directly to the underlying stylesheet.

Match Conditions and Generators

Here is an example of an xsl:template statement from an XSLT stylesheet:

```
<xsl:template match = "dep">
    <xsl:text>Departing</xsl:text>
    <xsl:apply-templates/>
    <br/>
</xsl:template>
```

The present invention represents this construct shown above as a "rule" within the stylesheet as a logic construct. This rule in this example contains a match condition, the "dep" portion of the xsl:template statement. The "dep" match condition will be used to match elements within the input XML document to determine whether the matched element will be further processed by this rule.

Each statement within the structure enclosed by the <xsl:template> statement and the </xsl:template> statement is considered to be a "generator". A generator directly or indirectly is linked to an element in the output document. That is, a generator generates some object in the output document. In this example, there are three generators within this rule: an xsl:text generator, and xsl:apply-templates generator, and a default text (producting "<br/>") generator.

The logical constructs of rules, match conditions, and generators are one aspect of the XSL stylesheet model 23 of the present invention as shown in FIG. 2. With stylesheet centric editing, the user interacts with the match conditions and generators to effect changes to their stylesheet. By changing the match condition of a rule, the user modifies which input XML elements are processed by this rule. By changing the generators associated with a match condition, the user modifies what is produced in the ouput document. Changes made by the user to the stylesheet model 23 are then automatically incorporated into the underlying stylesheet 10 by the editor.

Figure 3:
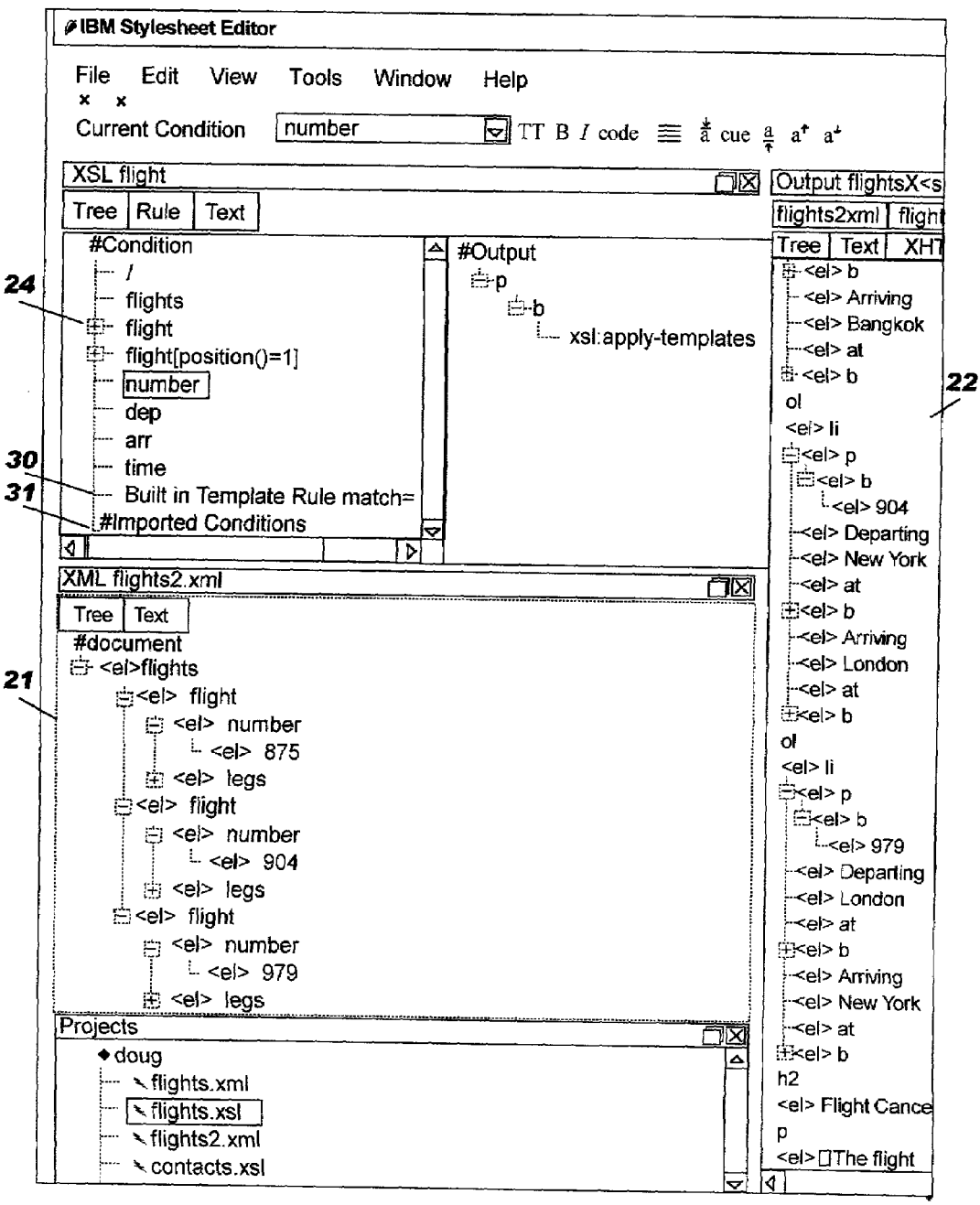
FIG. 3 shows a sample GUI showing the input XML sample view, the XSL stylesheet rules view, and the output result view.

FIG. 3 shows one example of the GUI representation providing the user with a selected sample view 21 of the source XML 11, a selected output result view 22 of the output document 12, and a selected rules view 24 of the stylesheet model 23.

Figure 4:
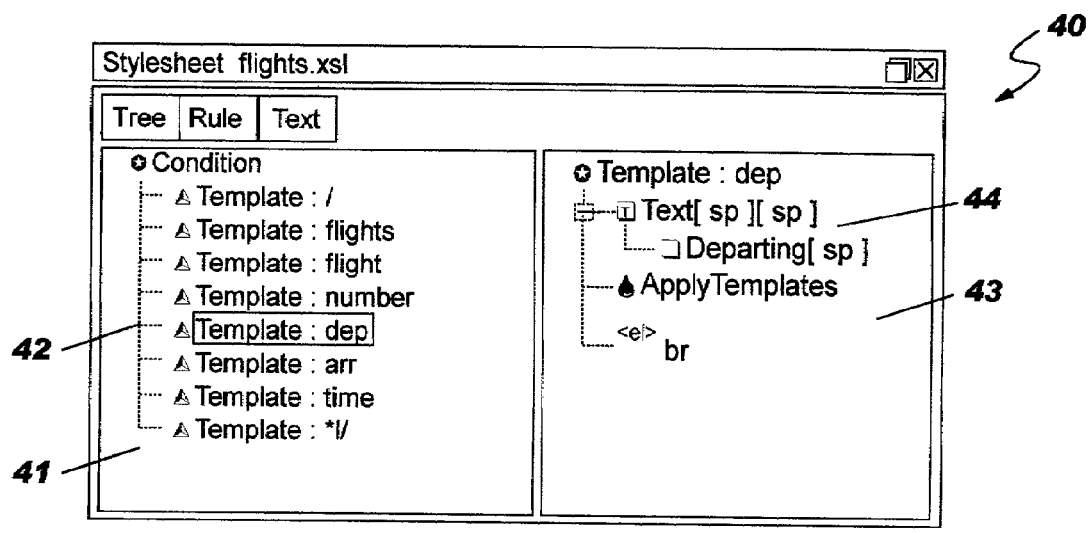
FIG. 4 shows another stylesheet rules view example.

The rules view 40 shown in FIG. 4 is a visual representation of the logical pieces of a stylesheet, as developed by the XSL stylesheet model 23 and seen by the user on the GUI. In this implementation 40 of a rules view user interface, the lefthand side 41 of the window contains a set of match conditions corresponding to the rules in the stylesheet being edited. In this example, the stylesheet rule 42 with a match condition of "dep" has been selected. In the righthand side 43 of the window, the generators 44 associated with the selected rule are displayed. In this example, there are two generators associated with the "dep" rule.

For more complicated stylesheets, the righthand view 43 could also contain test conditions, in addition to the match conditions illustrated. The righthand view 43 could also contain defaults rules (i.e., rules not actually in the stylesheet but representing built-in rules followed by the XSLT processor) and imported rules (rules located physically within another stylesheet but logically included in this stylesheet using an xsl:import statement), as demonstrated by labels 30 and 31 of FIG. 3.

Figure 5:
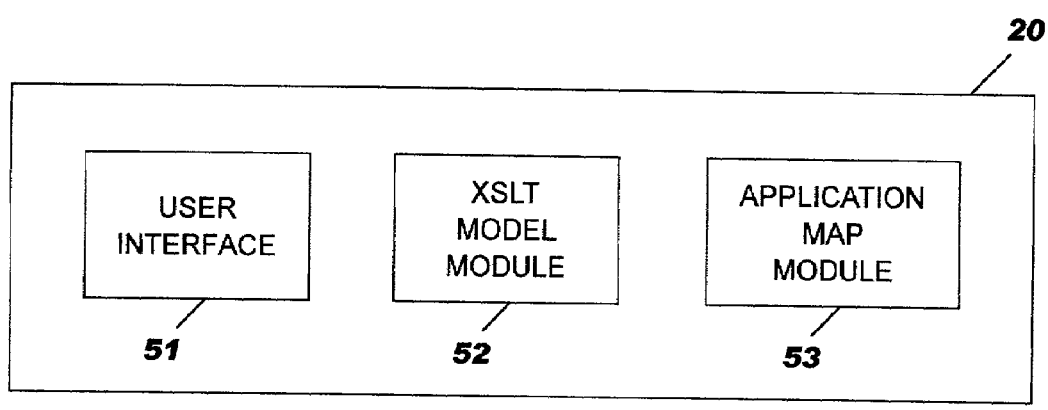
FIG. 5 shows a basic block diagram of the exemplary XSL editor.

FIG. 5 shows a block diagram of the basic editor 20. User interface 51 provides the GUI. XSLT Model Module 52 develops and maintains a model of the underlying XSLT stylesheet. Application Map Module 53 maintains a file of trace events occurring when an XML source document 11 is executed by the transformation engine 13 to produce the output document 12 (as shown in FIG. 2).

The XSLT Stylesheet Model

Figure 6:
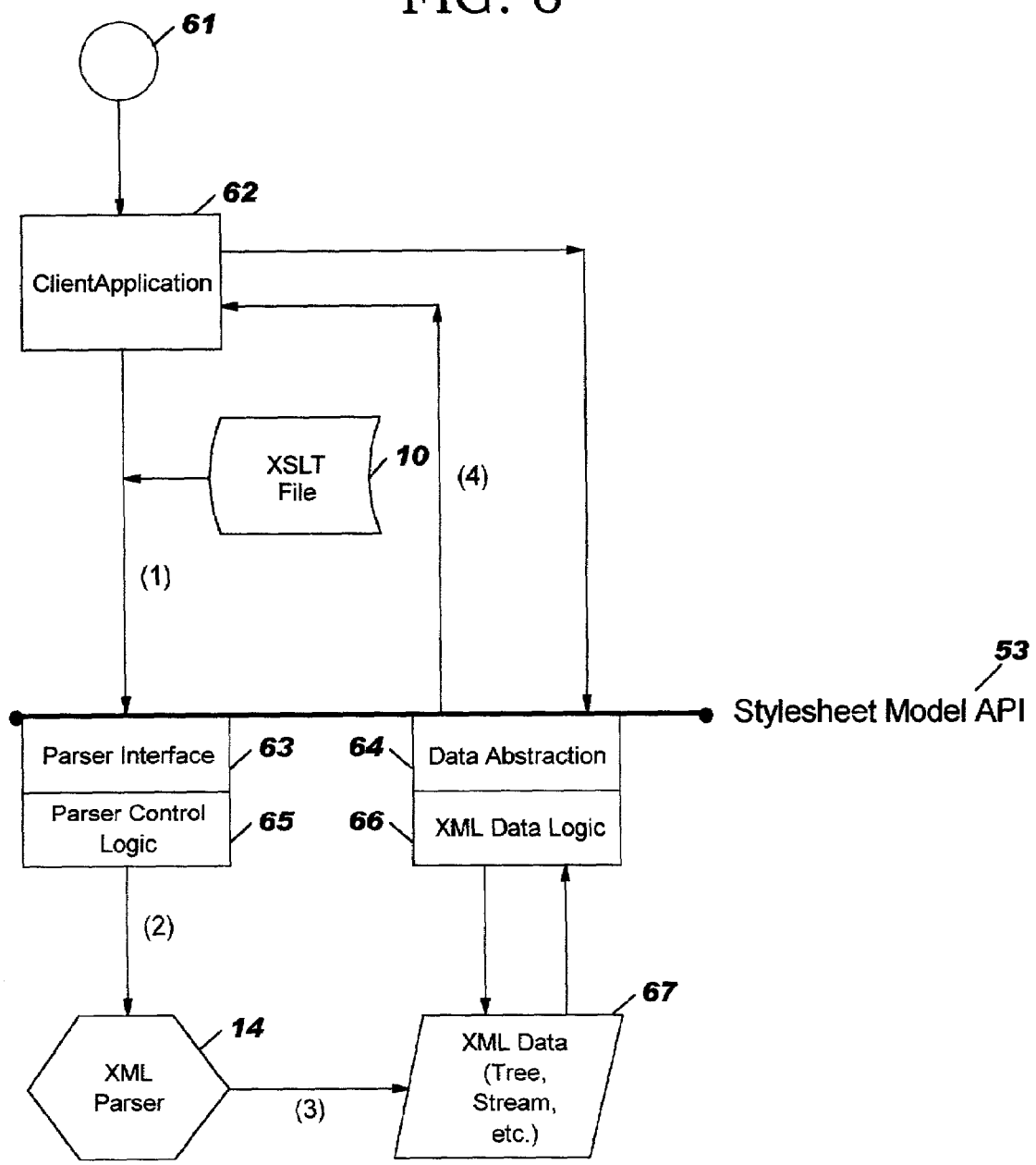
FIG. 6 shows a process of creation of the stylesheet model using the Model module.

FIG. 6 shows an exemplary implementation of the creation of a stylesheet model. User 61 invokes the client application 62 (such as the XSL Stylesheet Editor) and selects an XSLT file 10, the Stylesheet Model Module 53 (referred to in FIG. 6 as a Stylesheet Model Application Program Interface "API") receives a command (step 1) to construct the XSL Stylesheet Model.

In step 2 the Parser Interface 63 of the model module selects the appropriate Parser Control Logic 65 for the specific XML Parser 14. The Parser Control Logic 65 causes the XML Parser 14 to parse the XSLT file to generate (step 3) an XML data representation 67 in one of a format such as XML Tree or XML Stream. Data Abstraction module 64 selects the appropriate XML Data Logic 66 to receive this XML data and store it within the model.

In step 4, the user 61 interacts with the client application 62 to query and manipulate the stylesheet model, using an interface in the Data Abstraction module 64. As mentioned earlier, the XSL stylesheet model is essentially a categorization and representation of the underlying stylesheet in which the stylesheet rules are logically parsed into an "input" side containing a condition to match elements and an "output" side containing "generators" used to produce elements in the output document.

There are three key features to the technique of modeling the underlying stylesheet in accordance with the present invention.

First, the Stylesheet Model is independent of the underlying implementation. When a stylesheet is parsed by parser 14 in FIG. 2, an XML tree structure representing the stylesheet is created in memory (the implementation). Thus, the Stylesheet Model is an abstract representation of the stylesheet built on top of the XML tree structure. The Stylesheet Model can be built on any stylesheet implementation independent of the structure that is created in memory. Stylesheet editing functions that are written to the Stylesheet Model do not have to be rewritten when there is a change to the underlying implementation. This makes it easier for the present invention to pick up improvements in the parser or XML structure representations.

Second, the Stylesheet Model simplifies the syntax and semantics of XSLT stylesheets. The programming interfaces of the Stylesheet Model understand the syntax and semantics of XSLT. This frees the user from having to understand a complicated XSLT syntax or having to learn the semantics of a generic XML tree programming model to develop editing functions.

Third, the Stylesheet Model's categorization of XSLT elements into units, generators, rules, and applications allows the present invention to develop powerful polymorphic editing functions. The expansion algorithm described below is one example of this capability (i.e., although there are many kinds of generators, they are all expanded the same way using the stylesheet model).

Figure 7:
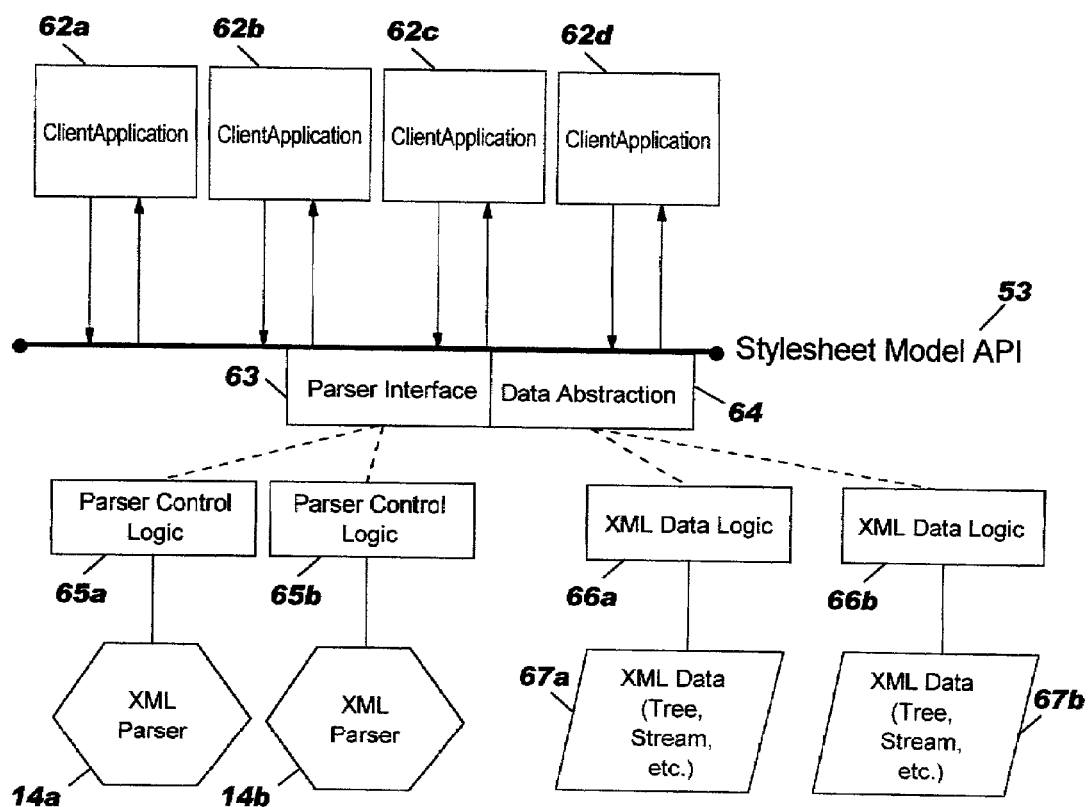
FIG. 7 shows the advantage of using the model concept for an XSL editor.

FIG. 7 shows the value of implementation independence. Shown exemplarily are four client applications 62a–62d. Because the Stylesheet Model API 53 is implementation-independent, the client applications 62a–62d do not directly interface with the XML Parser 14a, 14b or the XML Data Representation 67a, 67b. This makes it possible to switch XML Parsers 14a, 14b or XML Data Representations 67a, 67b without rewriting a single line of the client applications 62a–62d. When a new XML Parser is added or a new XML Data Representation is used, the Stylesheet Model API authors simply rewrite the Parser Control Logic 65a, 65b and XML Data Logic 66a, 66b to accommodate the new Parser/Data Representation. From the perspective of the client applications, the Stylesheet Model API is constant (transparent).

Application Maps

In the present invention, during the processing of transforming source XML to result XML using an XSLT stylesheet, trace events are generated when elements in the stylesheet are used in the transformation process. By logging these events, this invention produces an "application map" of elements in the output document back to the generators in the stylesheet that produced the output elements, as executed by Application Map Module 53 in FIG. 5.

Expansion of Selection Using Application Maps

When changing a stylesheet, there are scenarios where it would be useful to select the rule that contains a generator. When the user has selected a generator, using this invention, they can then execute an expansion command to expand the selection to include all generators that are part of the same rule. The expansion command can be any predetermined GUI input, such as a hot key or clicking on a command icon on the screen.

By using the application maps that logged the transformation events as executed by the transformation engine, the rule that contains this generator can be easily determined by correlating input/output events of each generator, and all generators that are contained within this rule are then easily determined. The resulting set of generators can then be mapped to their corresponding output elements and the new expanded set of selected output elements can be displayed to the user.

Figure 8:
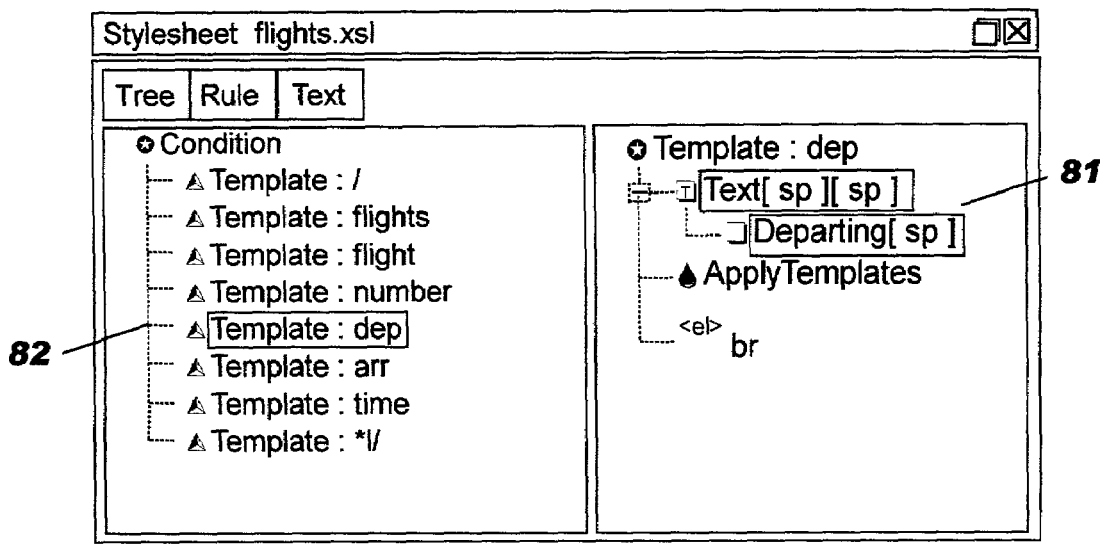
FIG. 8 and FIG. 9 demonstrate the Expansion function.
Figure 9:
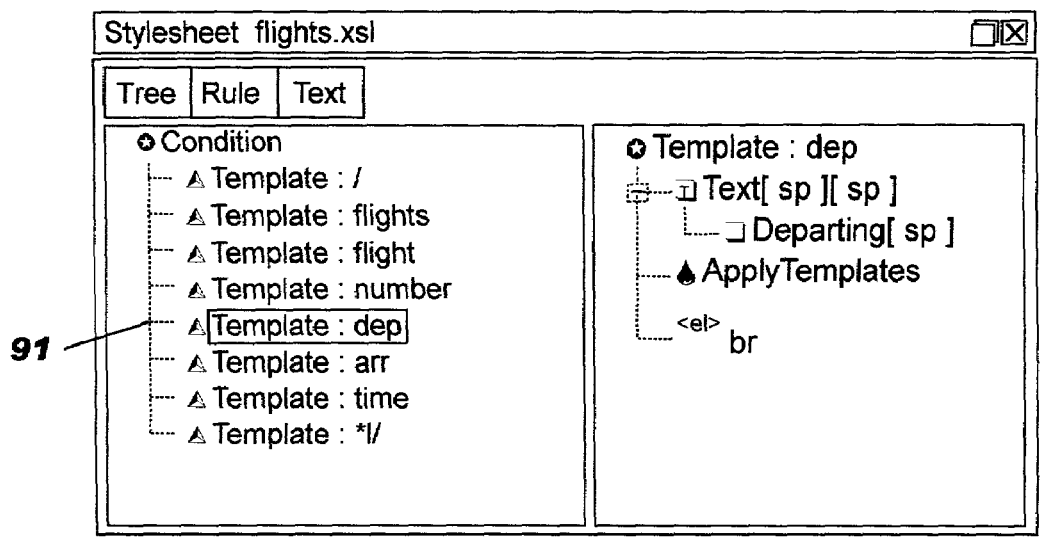

An example of "expansion" is shown in FIGS. 8 and 9. As shown in FIG. 8, the user has selected the xsl:text generator 81 contained within the "match=dep" xsl:template rule by a GUI interaction such as a mouse click. The dark highlighting 81 in the right pane shows the mouse click selection. The light highlighting 82 automatically shows the corresponding template rule in the stylesheet model as represented by the rule view on the left window pane. However, since XML is tree-structure based, the user has no way of knowing whether this generator 81 occurs in only the one rule 82.

FIG. 9 shows the result when the expansion function has been executed. Expansion of this selection would change the user's selection to be the rule that includes this generator, as shown by the dark highlighting 91.

Figure 10:
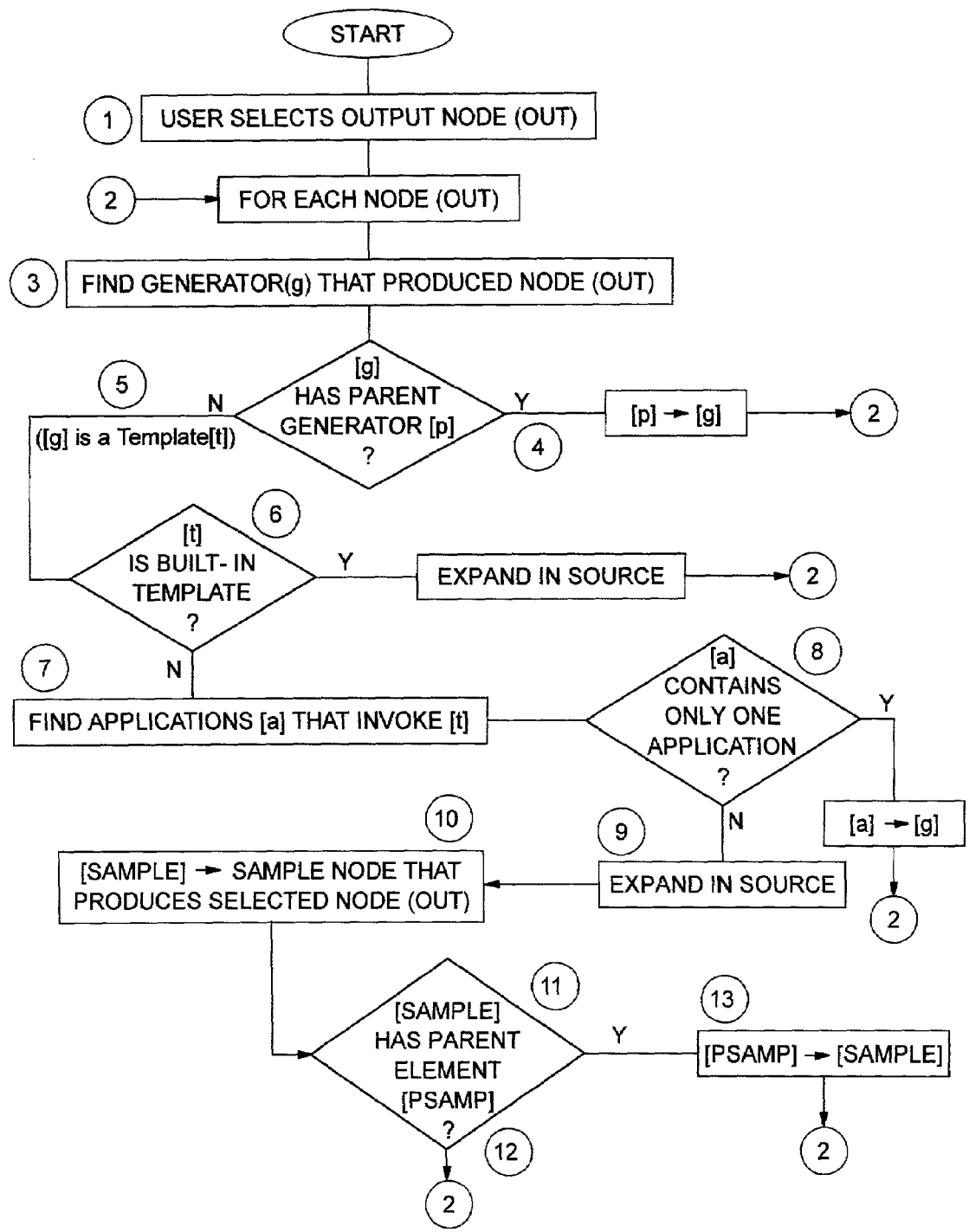
FIG. 10 is an exemplary flowchart of the Expansion function.

The following is one exemplary algorithm that can be used to expand a selection based on an initial user selection (see corresponding flowchart in FIG. 10):

1) User has selected node(s) in the result tree.

2) For every selected node [out] in the output, perform step #3.

3) Use Maps(output2xsl) to find Generator [g] that produces the output node [out].

4) If [g] has a parent Generator [p] in the stylesheet tree, clear the selection from [g] and select the parent [p]. Return to step #2.

5) If [g] does not have a parent Generator, it must be a Template [t].

6) If [t] is a built-in template, expand in source, goto 10.

7) If [t] is not a built in Template, use Maps (rule2app) to find the set of Applications [a] that invoke [t].

8) If the set [a] contains one Application clear the selection from [g] and select the Application [a]. Return to step #2.

9) If [a] contains more than one Application, expand in source, goto 10.

10) Use sample node [sample] that produces the output node [out].

11) If [sample] has a parent element [psamp] goto #13.

12) Selection cannot be expanded further. Return to step #2.

13) Clear selection from [sample] and select [psamp]. Return to step #2.

Note: the next time expansion is run on the same outnode, start with the currently selected Generator [g] at step #4.

Insertion of Markup Using Application Maps

Another use of the application maps is the ability to use the expansion function together with the knowledge of the rules of the markup produced by the generators to determine, based on a user's selection, whether certain markup can be added to the generator. For example, if a stylesheet produces correct XHTML markup, based on a user's selection of a generator, it can be determined whether it will be proper to allow each type of XHTML markup to be added to the generator. This analysis is based on using the application maps to determine the XHTML markup contained within the parent of this generator.

Hardware Implementation

Figure 11:
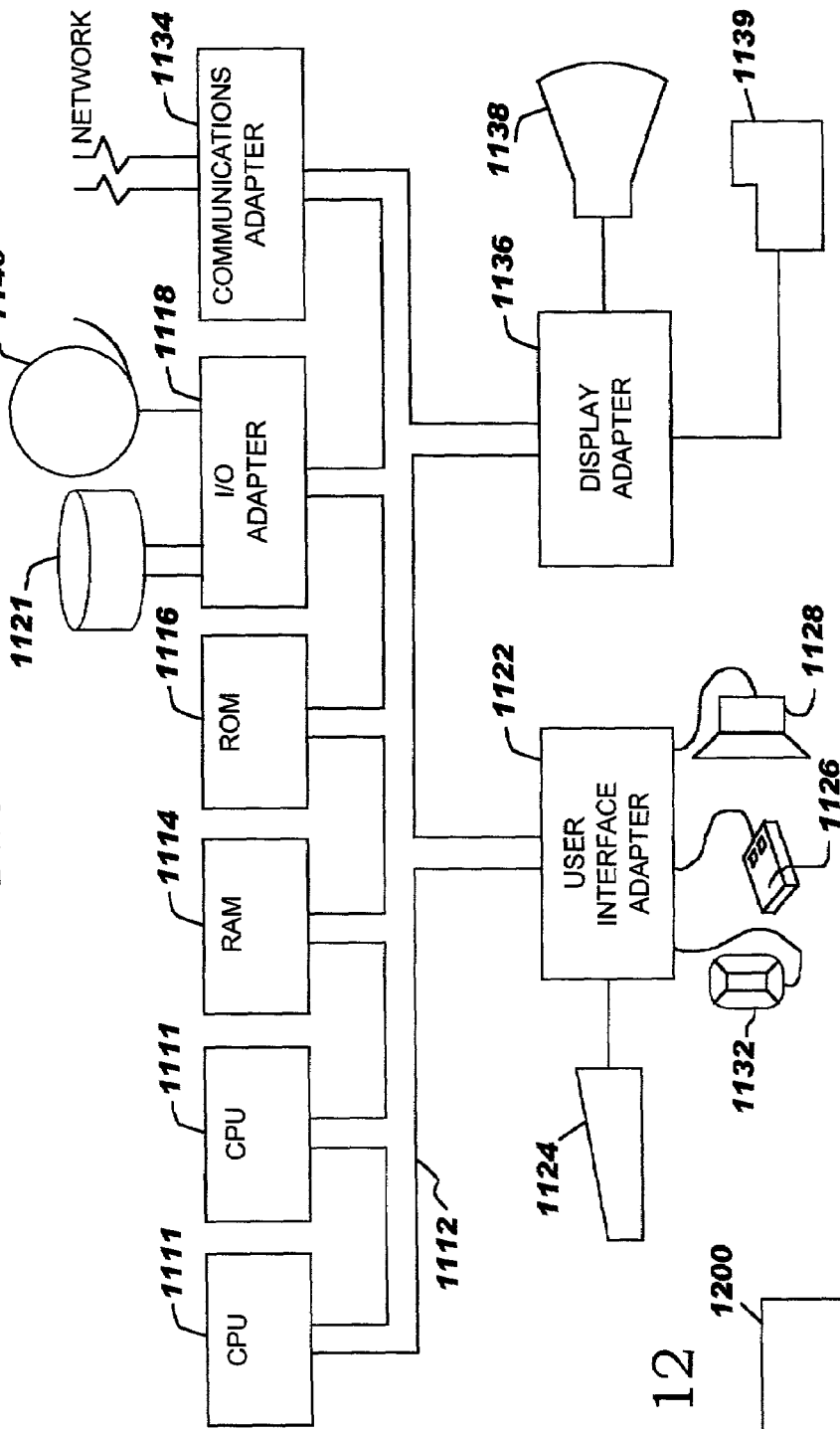
FIG. 11 illustrates an exemplary hardware/information handling system 1100 for incorporating the present invention therein.

FIG. 11 illustrates a typical hardware configuration of an information handling/computer system in accordance with the invention and which preferably has at least one processor or central processing unit (CPU) 1111.

The CPUs 1111 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1111 and hardware above, to perform the method of the invention.

Figure 12:
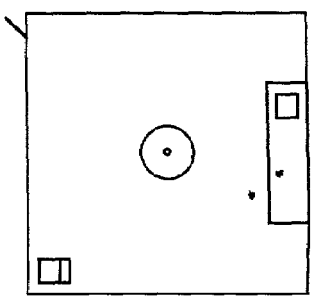
FIG. 12 illustrates a signal bearing medium 1200 (e.g., storage medium) for storing steps of a program of a method according to the present invention.

This signal-bearing media may include, for example, a RAM contained within the CPU 1111, as represented by the fast-access storage for example. Alternatively, the instructions may be contained in another signal-bearing media, such as a magnetic data storage diskette 1200 (see FIG. 12), directly or indirectly accessible by the CPU 1111.

Whether contained in the diskette 1200, the computer/CPU 1111, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method in a data processing system for enacting changes to a document containing a template-based program that transforms tree-structured data from a first tree-structured data into a second free-structured data, said method comprising:

providing a first user interface to permit selection of a document containing said template-based program and a document including the first tree-structured data;

wherein the first user interface constructs a model of the second tree-structured data of the first tree-structured data, based on said template-based program;

displaying a representation of said model to a user at a second user interface;

wherein the second user interface allows viewing said model and allows manipulations to elements within said model;

parsing elements of said model into a corresponding logical construct comprising a match condition and at least one generator, said match condition for determining whether an element in said first tree-structured data is to be processed by one or more of said at least one generator; and automatically updating said document containing said template-based program to reflect said manipulations of said model elements.

2. The method of claim 1, further comprising:
providing a user interface to make a selection of a tree-structure-based input to be transformed by said template-based program on said selected document.

3. The method of claim 1, further comprising:
constructing an application map comprising a listing of events of an execution of said transformation defined by said template-based program.

4. The method of claim 1, wherein said template-based program comprises a tree-structure syntax.

5. The method of claim 4, wherein said first tree-structured data and said second tree-structured data comprise eXtensible Mark-up Language (XML) data and said template-based program comprises an XSLT (eXtensible Style Language Transformations) stylesheet.

6. The method of claim 1, as embodied in an application program running on a computer.

7. An editor for enacting changes to a document containing a template-based program that transforms tree-structured data from a first tree-structured data into a second tree-structured data, said editor comprising:

a first user interface to permit selection of a document containing said template-based program and a document including the first tree structured data;

wherein the first user interface constructs a model of the second tree-structured data of the first tree-structured data, based on said template-based program;

a second user interface for displaying a representation of said model to a user;

wherein the second user interface allows viewing said model and allows manipulations to elements within said model;

a parser for parsing elements of said model into a corresponding logical construct comprising a match condition and at least one generator, said match condition for determining whether an element in said first tree-structured data is to be processed by one or more of said at least one generator; and an updater to autonomically update said document containing said template-based program to reflect said manipulations of said model elements.

8. The editor of claim 7, timber comprising:
a user interface to make a selection of a free-structure-based input to be transformed by said template-based program on said selected document.

9. The editor of claim 7, further comprising:
an application map file comprising an application map having a listing of events of an execution of said transformation defined by said template-based program.

10. The editor of claim 7, wherein said template-based program comprises a tree-structure syntax.

11. The editor of claim 10, wherein said first tree-structured data and said second tree-structured data comprise eXtensible Mark-up Language (XML) data and said template-based program comprises an XSLT (eXtensible Style Language Transformations) stylesheet.

12. A computer system including the editor of claim 7.

13. A signal-bearing medium tangibly embodying a program of machine-readable instructions executable by a digital processing apparatus to perform a method of enacting changes to a document containing a template-based program that transforms tree-structured data from a first free-structured data into a second tree-structured data, said method comprising:

providing a first user interface to permit selection of a document containing said template-based program and a document including the first tree-structured data;

wherein the first user interface constructs a model of the second tree-structured data of the first tree-structured data, based on said template-based program;

displaying a representation of said model to a user at a second user interface;

wherein the second user interface allows viewing said model and allows manipulations to elements within said model;

parsing elements of said model into a corresponding logical construct comprising a match condition and at least one generator, said match condition for determining whether an element in said first tree-structured data is to be processed by one or more of said at least one generator; and automatically updating said document containing said template-based program to reflect said manipulations of said model elements.

14. The signal-bearing medium of claim 13, said method further comprising:
   providing a user interface to make a selection of a tree-structure-based input to be transformed by said template-based program on said selected document.

15. The signal-bearing medium of claim 13, said method further comprising:
   constructing an application map comprising a listing of events of an execution of said transformation defined by said template-based program.

16. The signal-bearing medium of claim 13, wherein said template-based program comprises a tree-structure syntax.

17. The signal-bearing medium of claim 16, wherein said first tree-structured data and said second tree-structured data comprise eXtensible Mark-up Language (XML) data and said template-based program comprises an XSLT (eXtensible Style Language Transformations) stylesheet.

\* \* \* \* \*